United States Patent
Terada et al.

(10) Patent No.: US 9,941,541 B2
(45) Date of Patent: Apr. 10, 2018

(54) FUEL CELL STACK

(71) Applicant: HONDA MOTOR CO., LTD., Minato-Ku, Tokyo (JP)

(72) Inventors: Eri Terada, Utsunomiya (JP); Kimiharu Mizusaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 810 days.

(21) Appl. No.: 14/452,574

(22) Filed: Aug. 6, 2014

(65) Prior Publication Data
US 2015/0044592 A1  Feb. 12, 2015

(30) Foreign Application Priority Data
Aug. 9, 2013 (JP) .................. 2013-166129
Jul. 24, 2014 (JP) .................. 2014-150419

(51) Int. Cl.
| H01M 8/24 | (2016.01) |
| H01M 8/2465 | (2016.01) |
| H01M 8/1004 | (2016.01) |
| H01M 8/0202 | (2016.01) |
| H01M 8/04537 | (2016.01) |

(52) U.S. Cl.
CPC ....... *H01M 8/2405* (2013.01); *H01M 8/0202* (2013.01); *H01M 8/04544* (2013.01); *H01M 8/1004* (2013.01); *H01M 8/2465* (2013.01)

(58) Field of Classification Search
None
See application file for complete search history.

(56) References Cited

U.S. PATENT DOCUMENTS

| 7,510,795 B2* | 3/2009 | Sakano .............. H01M 8/02 429/406 |
| 7,682,714 B2* | 3/2010 | Aoto ................ H01M 8/0247 429/430 |
| 7,799,480 B2* | 9/2010 | Nishiyama ......... H01M 8/0258 429/456 |
| 9,034,536 B2* | 5/2015 | Mizusaki ............ H01M 8/242 429/482 |
| 2006/0035132 A1* | 2/2006 | Ariyoshi ........... H01M 8/0247 429/468 |
| 2006/0088740 A1 | 4/2006 | Sakano et al. |
| 2006/0216558 A1* | 9/2006 | Miyazawa ......... H01M 8/0247 429/430 |
| 2008/0187805 A1* | 8/2008 | Jinba ............... H01M 8/04052 429/433 |

(Continued)

FOREIGN PATENT DOCUMENTS

| JP | 9-55221 | * 2/1997 | .......... H01M 8/24 |
| JP | 3870719 B2 | 1/2007 | |

(Continued)

*Primary Examiner* — Rena Dye Cronin
(74) *Attorney, Agent, or Firm* — Carrier Blackman & Associates, P.C.; Joseph P. Carrier; Anne G. Sabourin

(57) ABSTRACT

In a fuel cell stack, voltage detecting terminals are disposed on a second separator and a third separator of a power generation unit, whereas a voltage detecting terminal is not disposed on a first separator of the power generation unit. Among terminal plates of the fuel cell stack, another voltage detecting terminal is disposed only on the terminal plate that is in contact with the first separator.

5 Claims, 16 Drawing Sheets

(56) References Cited

U.S. PATENT DOCUMENTS

| | | | | |
|---|---|---|---|---|
| 2010/0119907 A1* | 5/2010 | Shibata | ............... | H01M 8/0247 |
| | | | | 429/432 |
| 2010/0178590 A1* | 7/2010 | Shirakawa | .......... | H01M 8/0232 |
| | | | | 429/507 |
| 2012/0258378 A1* | 10/2012 | Sugita | ................. | H01M 8/0267 |
| | | | | 429/456 |

FOREIGN PATENT DOCUMENTS

| JP | 4060257 B2 | 3/2008 |
|---|---|---|
| JP | 4516403 B2 | 5/2010 |
| JP | 4708101 B2 | 6/2011 |
| JP | 2012-059563 A | 3/2012 |

\* cited by examiner

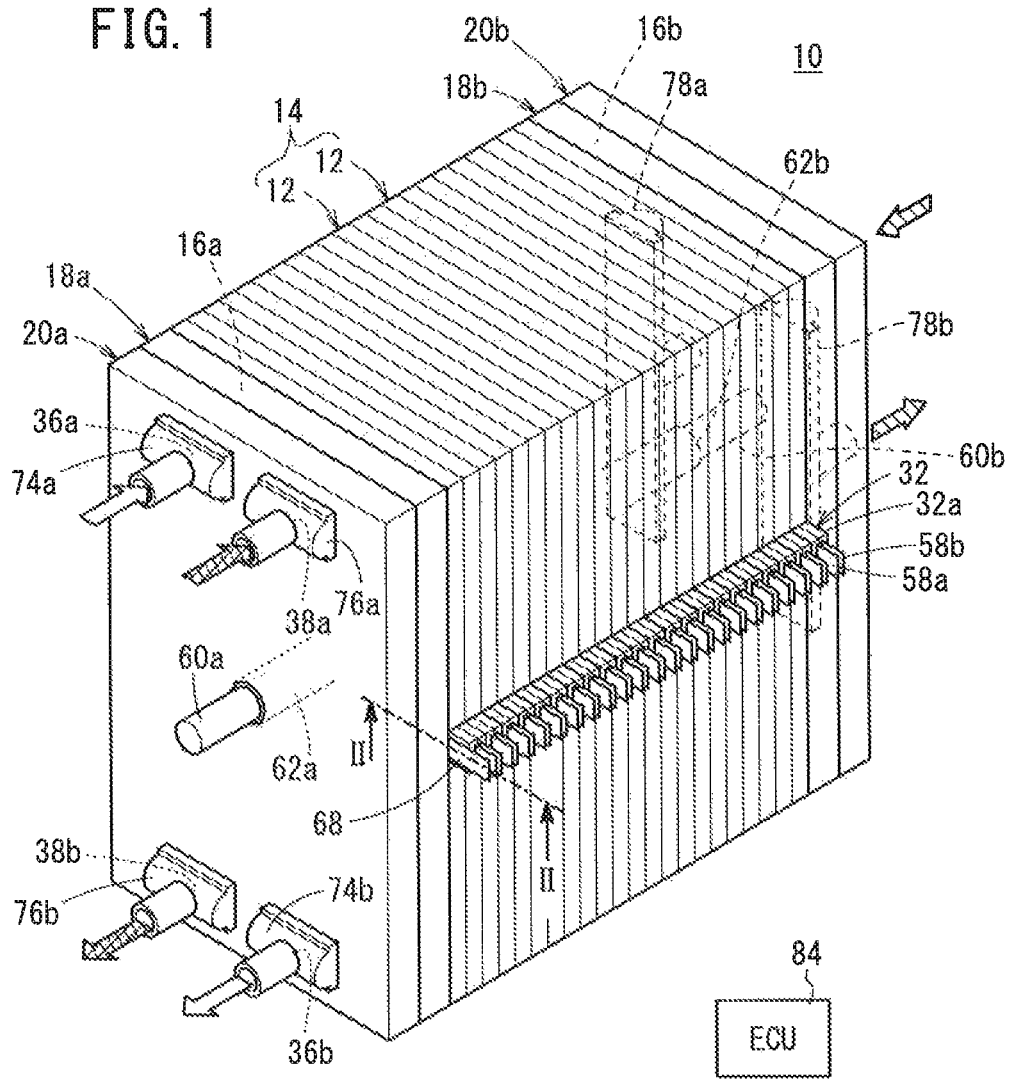
FIG. 1
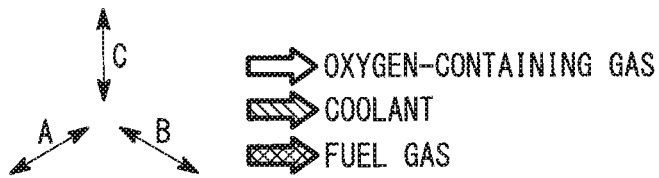

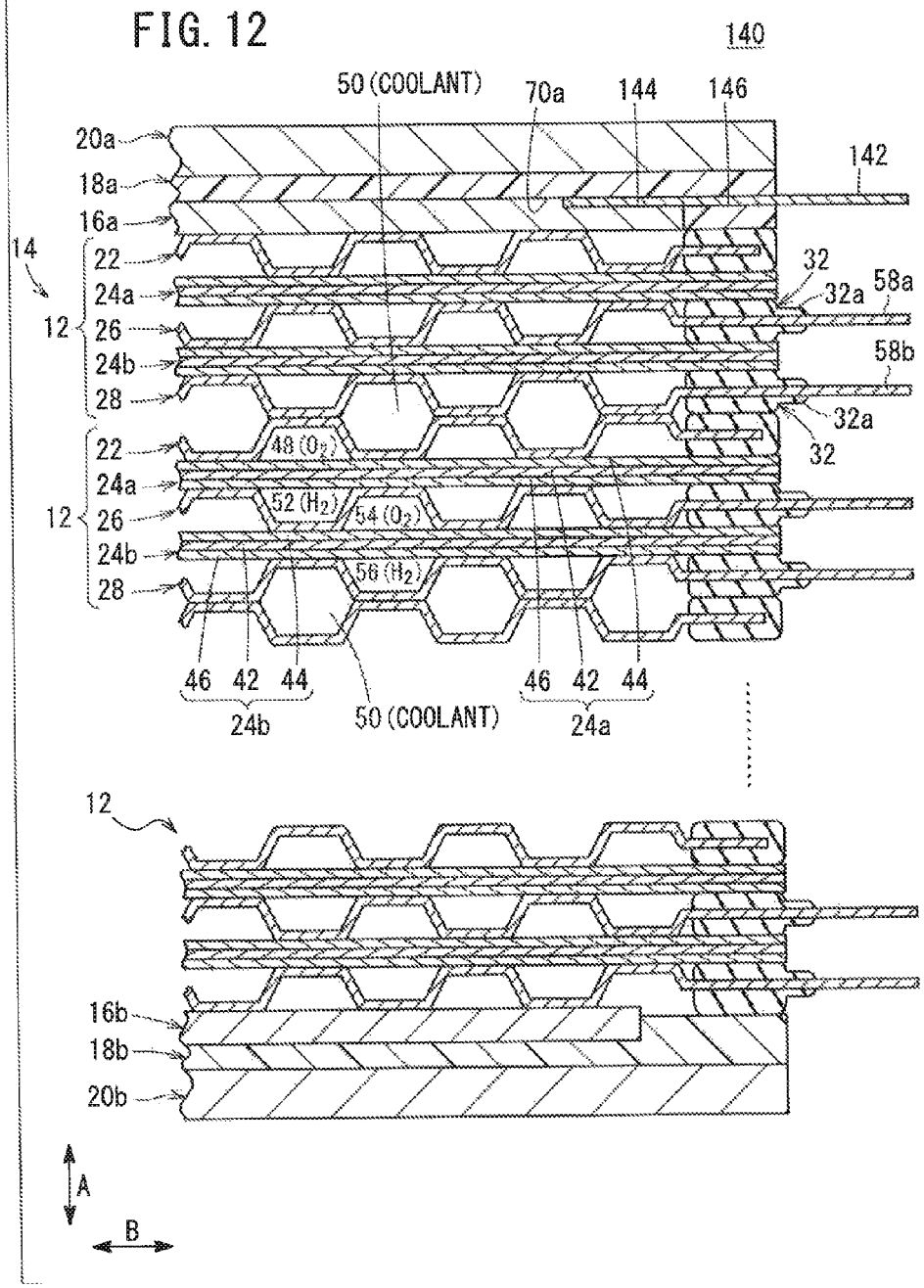

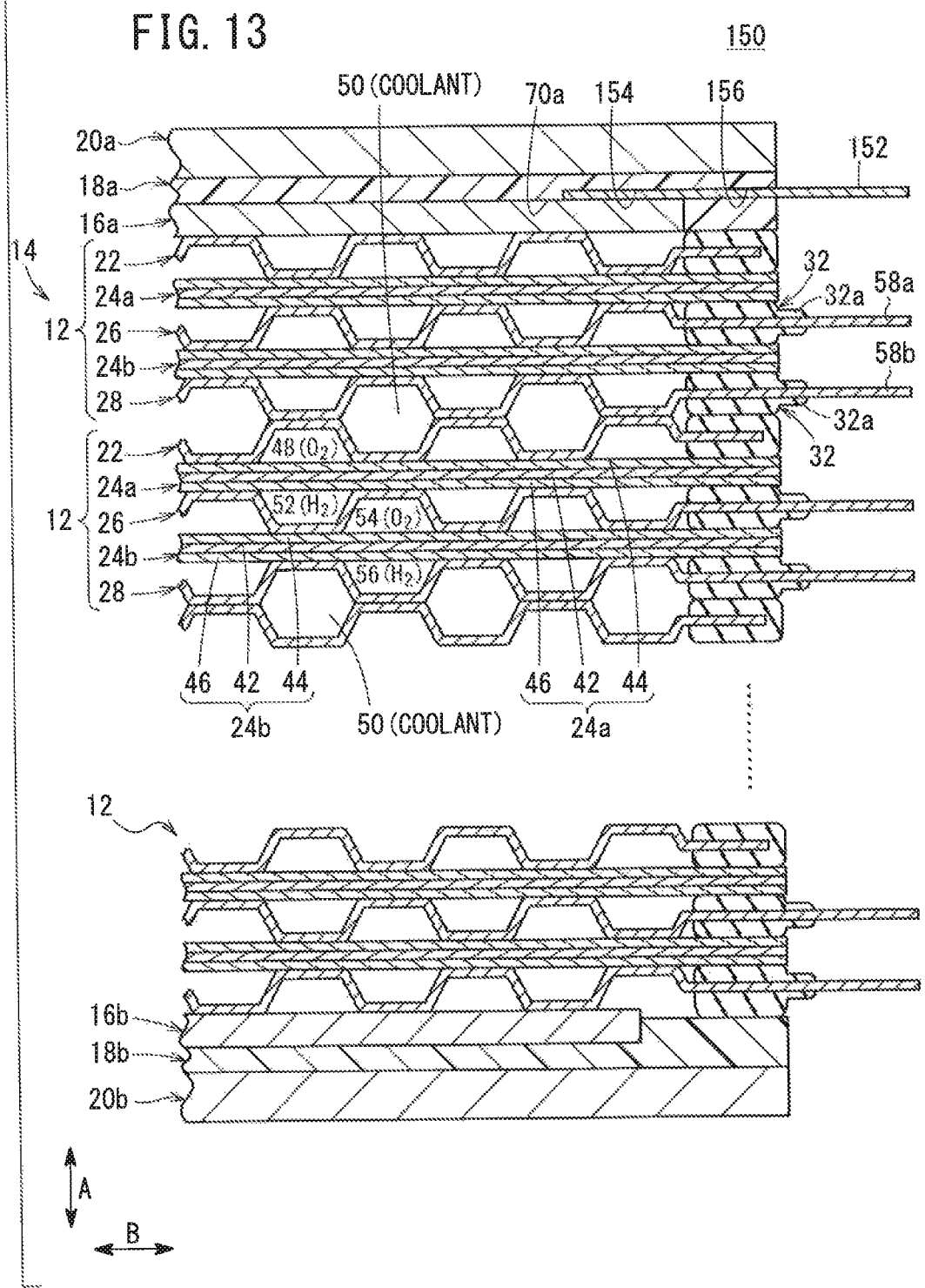

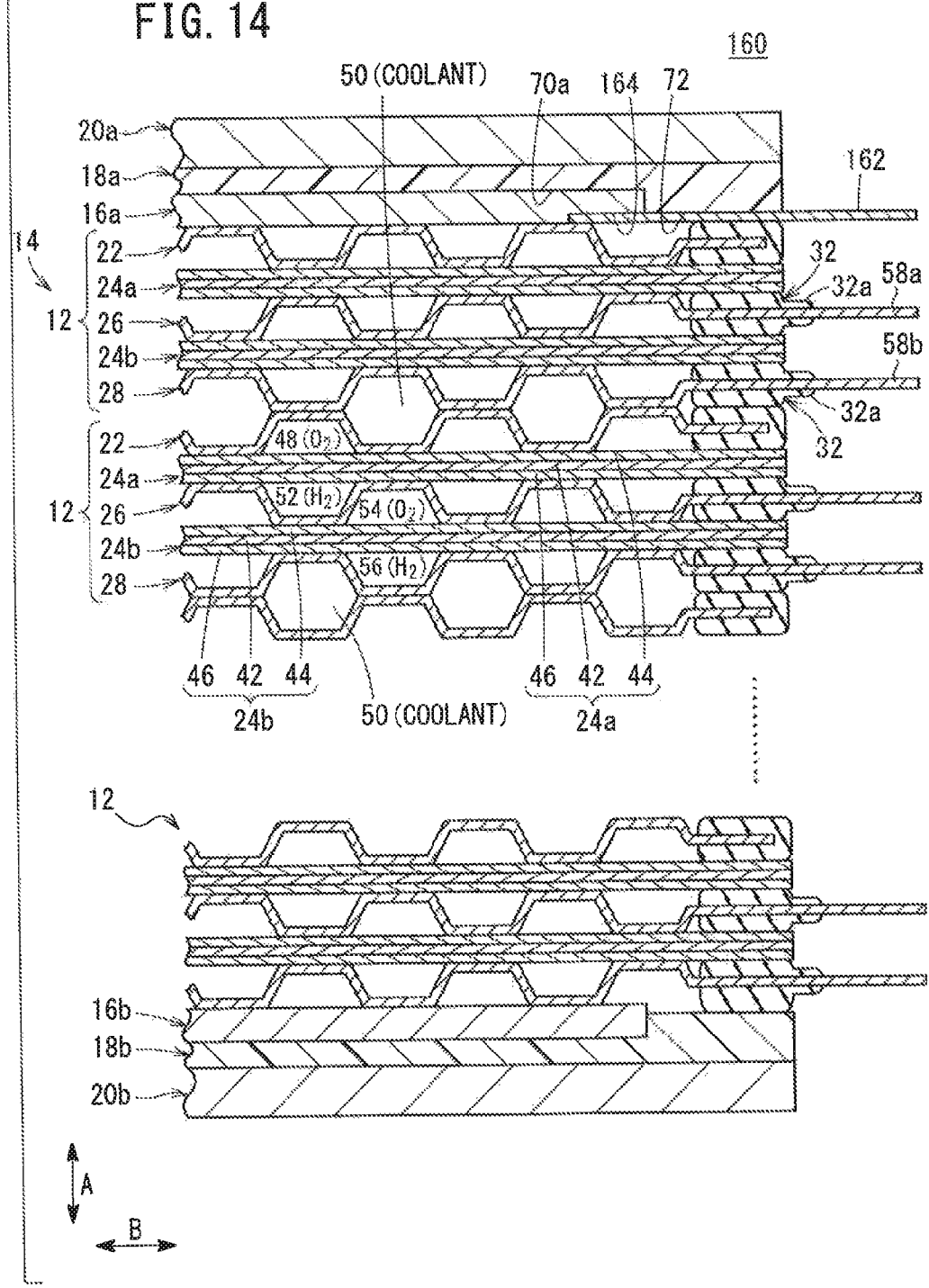

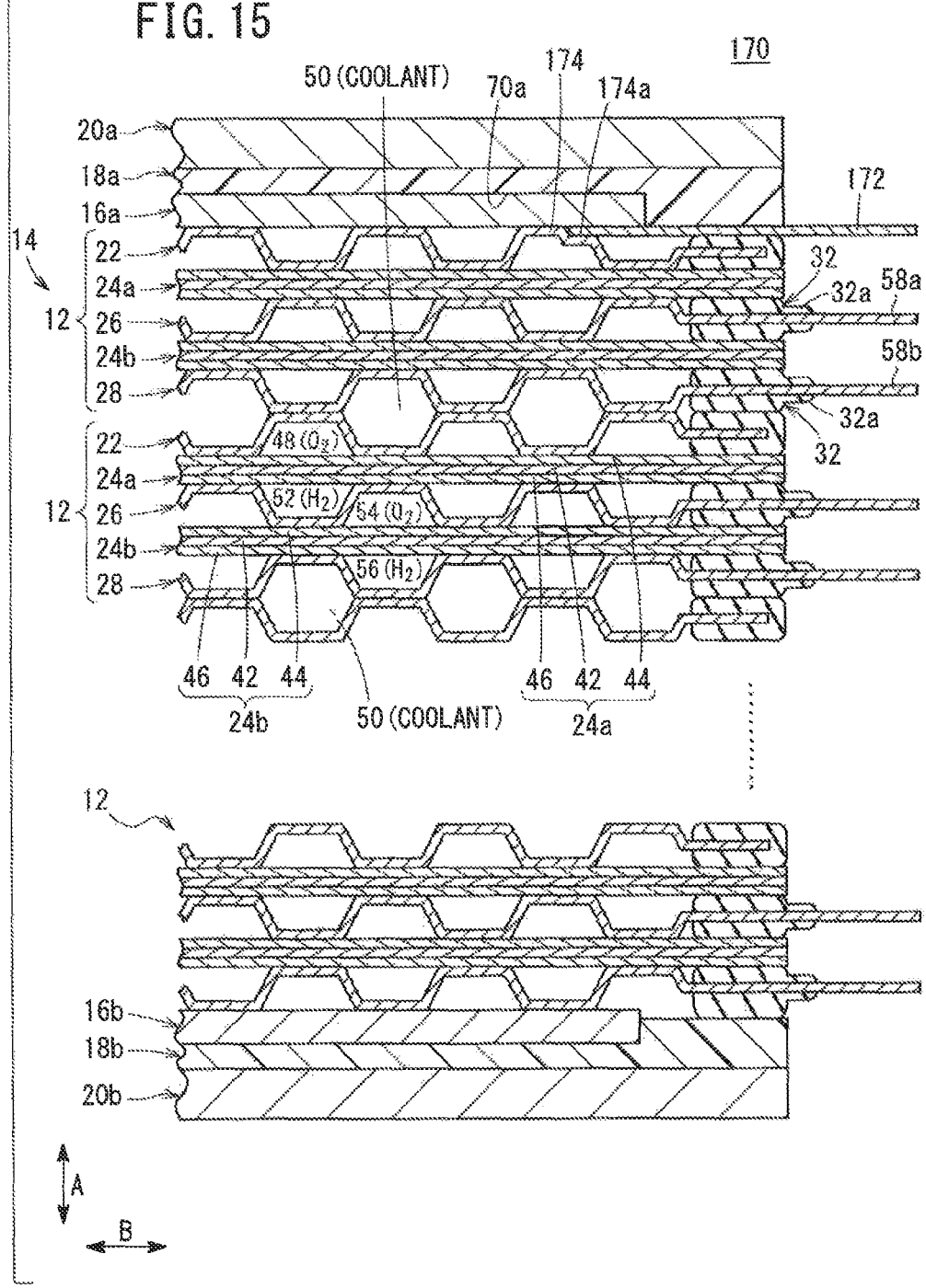

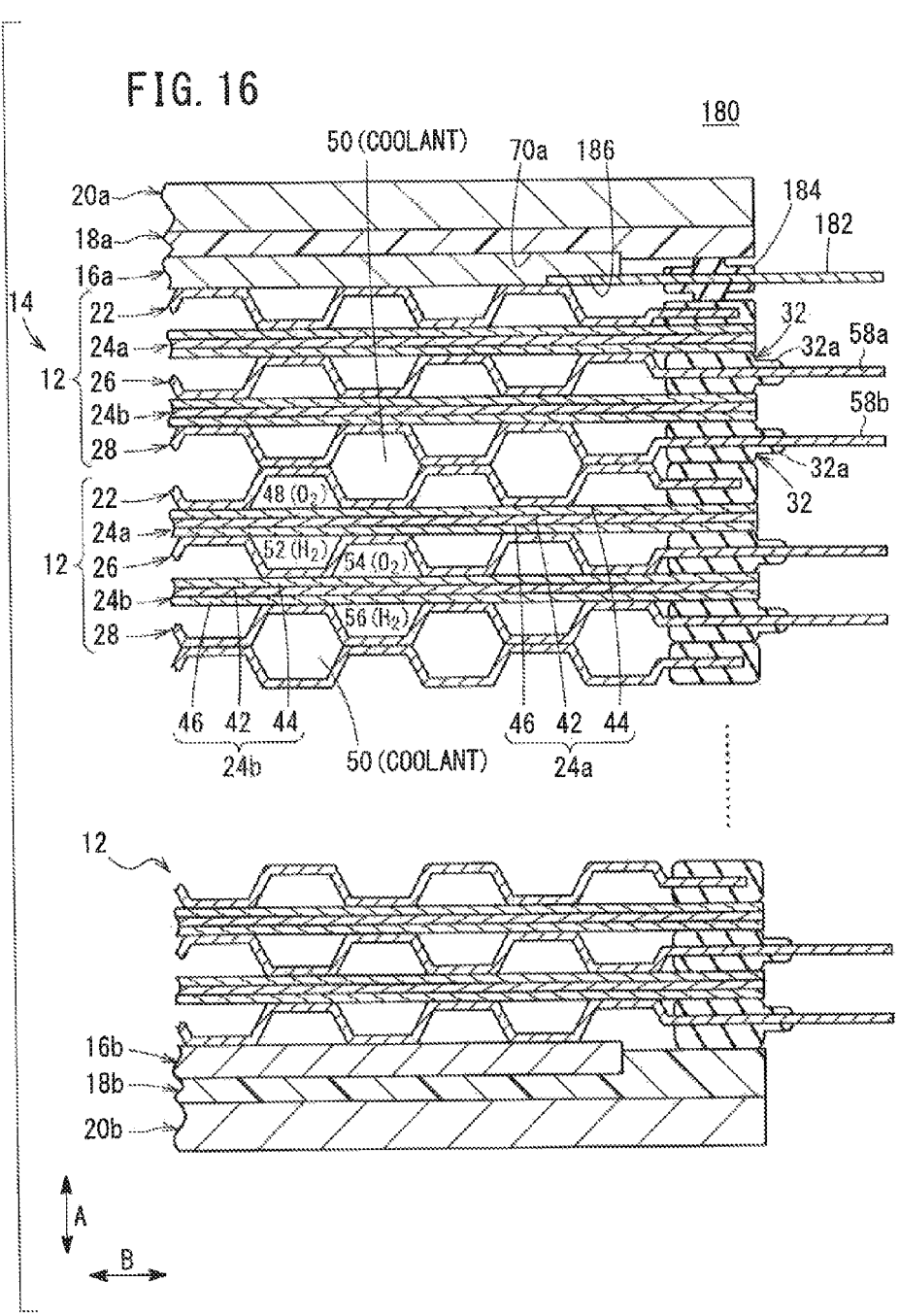

FUEL CELL STACK

CROSS-REFERENCE TO RELATED APPLICATIONS

This application is based upon and claims the benefit of priority from Japanese Patent Applications No. 2013-166129 filed on Aug. 9, 2013 and No. 2014-150419 filed on Jul. 24, 2014, the contents all of which are incorporated herein by reference.

BACKGROUND OF THE INVENTION

Field of the Invention

The present invention relates to a fuel cell stack including a stacked body formed by stacking a plurality of power generation cells for generating electrical energy. Each of the power generation cells is formed by stacking an electrolyte electrode assembly and separators. Each of the electrolyte electrode assemblies includes an electrolyte and a pair of electrodes provided respectively on both sides of the electrolyte.

Description of the Related Art

For example, a solid polymer electrolyte fuel cell employs a polymer ion exchange membrane as an electrolyte membrane. In the fuel cell, the electrolyte membrane is interposed between an anode and a cathode to form a membrane electrode assembly (MEA). The membrane electrode assembly and separators sandwiching the membrane electrode assembly make up a power generation cell for generating electricity. In use, typically, a predetermined number of the power generation cells are stacked together to form a fuel cell stack, which is mounted in a vehicle, for example.

With such a fuel cell stack, for obtaining a desired power generating capability, a predetermined number (e.g., from several tens to several hundreds) of the power generation cells are stacked, and there exists a need to detect whether or not each of the power generation cells has a desired power generating capability. For this purpose, in general, cell voltage monitoring terminals, which are disposed on the separators, are connected to a voltage detecting device (cell voltage monitor), and during power generation, an operation is performed to detect the cell voltage of each of the power generation cells.

For example, as disclosed in Japanese Patent No. 3870719, a fuel cell is known having a connection structure for connecting cell-voltage monitoring connectors to the cells thereof. With this fuel cell, one terminal from among a plurality of cell-voltage monitoring connectors is placed in contact with a separator of one of the cells that make up the fuel cell. In addition, another terminal is placed in contact with a separator, which is of the same polarity as the separator contacting with the one terminal, of another cell that differs from the one cell. On peripheral edge portions of the separators with which the terminals are placed in contact, portions are formed that protrude beyond peripheral edge portions where the terminals are not connected, and the terminals and the separators are placed in contact with each other at the protruding portions.

To inspect the voltage of one of the cells, monitoring is performed between a separator of the one cell and a separator of the next cell that is the same polarity. Consequently, in the case that the voltage of the last cell of the cell stack body is to be inspected, since there is no such next cell, the cell voltage of the last cell cannot be inspected. For this reason, a conductive cover plate (dummy separator), which is of the same shape as the separators to which terminals of the cell-voltage monitoring connector are connected, is disposed on an end of the cell stack body of the fuel cell. Stated otherwise, the terminal of the cell-voltage monitoring connector is connected to the cover plate. Therefore, by inspecting a potential difference between the cover plate and the separator of the last cell, the cell voltage of the last cell can be monitored.

SUMMARY OF THE INVENTION

Incidentally, with the fuel cell described above, in order to inspect the voltage of the last cell of the cell stack body, it is necessary to provide a dedicated cover plate (dummy separator) on the end of the cell stack body. Consequently, the number of parts that make up the fuel cell stack increases, and the dimension in the stacking direction of the fuel cell becomes elongated.

The present invention has been devised to solve the aforementioned problems, and has the object of providing a fuel cell stack with a simple and compact structure, which enables the cell voltage to be measured suitably.

A fuel cell stack according to the present invention includes a stacked body formed by stacking, in a stacking direction, a plurality of power generation cells for generating electrical energy, each of the power generation cells being formed by stacking an electrolyte electrode assembly and separators, the electrolyte electrode assembly including an electrolyte and a pair of electrodes provided respectively on both sides of the electrolyte. Terminal plates are arranged on both ends in the stacking direction of the stacked body, and an end plate is stacked outwardly in the stacking direction of the terminal plate with an insulating plate interposed therebetween.

In addition, the power generation cell includes a voltage detecting terminal on at least one of the separators, and another voltage detecting terminal is provided integrally on only one of the terminal plates.

According to the present invention, since the voltage detecting terminal is disposed integrally only on one of the terminal plates, it is unnecessary to provide a dedicated dummy separator or the like. Consequently, there is no increase in the number of parts, and with a simple and compact structure, the cell voltage can be measured suitably.

The above and other objects, features and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 1 is a perspective view schematically showing a fuel cell stack according to a first embodiment of the present invention;

FIG. 12 is a cross sectional view of a fuel cell stack according to a fifth embodiment of the present invention;

FIG. 13 is a cross sectional view of a fuel cell stack according to a sixth embodiment of the present invention;

FIG. 14 is a cross sectional view of a fuel cell stack according to a seventh embodiment of the present invention;

FIG. 15 is a cross sectional view of a fuel cell stack according to an eighth embodiment of the present invention; and FIG. 16 is a cross sectional view of a fuel cell stack according to a ninth embodiment of the present invention.

DESCRIPTION OF THE PREFERRED EMBODIMENTS

Figure 2:
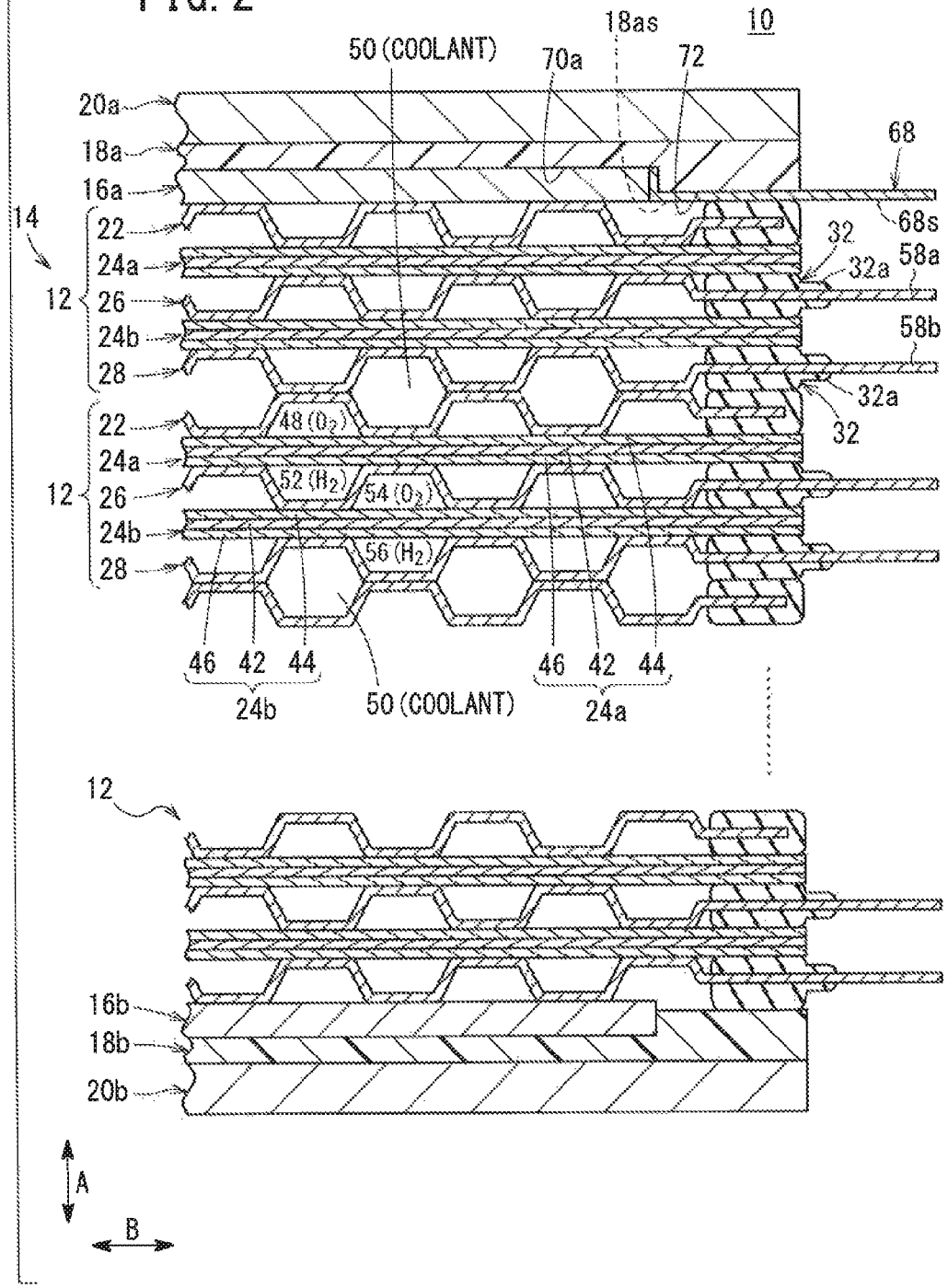
FIG. 2 is a cross sectional view of the fuel cell stack, taken along line II-II in FIG. 1.

As shown in FIGS. 1 and 2, a fuel cell stack 10 according to a first embodiment of the present invention comprises a stacked body 14 formed by stacking a plurality of power generation units (power generation cells) 12 in the direction of the arrow A. On both ends in the stacking direction of the stacked body 14, terminal plates 16a, 16b, insulating plates 18a, 18b, and end plates 20a, 20b are arranged outwardly in the stacking direction.

Components of the fuel cell stack 10 may be held integrally, for example, by a box-shaped casing (not shown) including the rectangular end plates 20a, 20b. Further, components of the fuel cell stack 10 may be held by being tightened together by a plurality of tie-rods (not shown) that extend in the direction of the arrow A.

Figure 3:
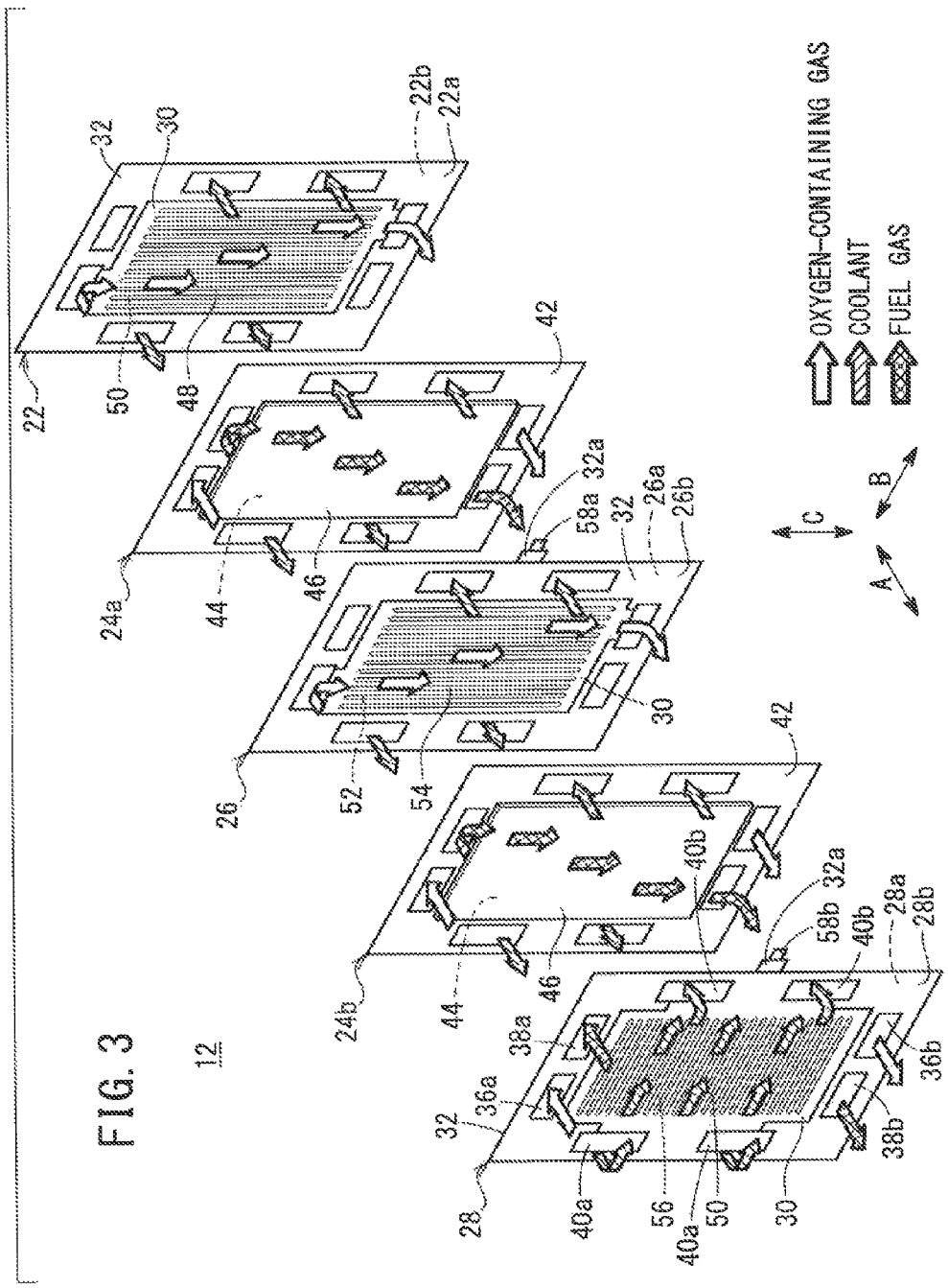
FIG. 3 is an exploded perspective view showing main components of a power generation unit of the fuel cell stack.

As shown in FIG. 3, a power generation unit 12 includes a first separator 22, a first membrane electrode assembly 24a, a second separator 26, a second membrane electrode assembly 24b, and a third separator 28, which are stacked in this order in the direction of the arrow A.

Each of the first separator 22, the second separator 26, and the third separator 28 has a rectangular shape, and is formed, for example, by corrugating a thin metal plate by press forming to have a corrugated shape (ridges and recesses) in cross section. As the thin metal plates, for example, metal plates such as steel plates, stainless steel plates, aluminum plates, plated steel sheets, or metal plates having anticorrosive surfaces formed thereon by a surface treatment may be used. For the first separator 22, the second separator 26, and the third separator 28, instead of metal, for example, carbon separators may be used.

Seal members 32 are formed integrally around the outer circumference of thin metal plates 30 provided respectively on the first separator 22, the second separator 26, and the third separator 28. Each of the seal members 32 is made of a seal material, a cushion material, or a packing material, such as an EPDM (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, an acrylic rubber, or the like.

At an upper end in a long-side direction of the power generation unit 12, an oxygen-containing gas supply passage 36a, and a fuel gas supply passage 38a are provided, which extend through the power generation unit 12 in the direction of the arrow A. The oxygen-containing gas supply passage 36a supplies an oxygen-containing gas. The fuel gas supply passage 38a supplies a fuel gas such as a hydrogen-containing gas.

At a lower end in the long-side direction of the power generation unit 12, a fuel gas discharge passage 38b for discharging the fuel gas and an oxygen-containing gas discharge passage 36b for discharging the oxygen-containing gas are provided, which extend through the power generation unit 12 in the direction of the arrow A.

On one end in a short-side direction (indicated by the arrow B) of the power generation unit 12, a pair of coolant supply passages 40a for supplying a coolant are provided, which extend through the power generation unit 12 in the direction indicated by the arrow A. On the other end in the short-side direction of the power generation unit 12, a pair of coolant discharge passages 40b for discharging the coolant are provided.

The first membrane electrode assembly 24a and the second membrane electrode assembly 24b each are equipped with a solid polymer electrolyte membrane 42. The solid polymer electrolyte membrane 42 is formed by impregnating a thin membrane of perfluorosulfonic acid with water, for example. The solid polymer electrolyte membrane 42 is interposed between a cathode 44 and an anode 46.

Each of the cathode 44 and the anode 46 has a gas diffusion layer (not shown) made from carbon paper or the like. An electrode catalyst layer (not shown) of a platinum alloy supported on porous carbon particles is deposited uniformly on the surface of the gas diffusion layer. The electrode catalyst layer of the cathode 44 and the electrode catalyst layer of the anode 46 are formed on both surfaces of the solid polymer electrolyte membrane 42, respectively.

On one surface 22a of the first separator 22 confronting the first membrane electrode assembly 24a, a first oxygen-containing gas flow field 48 is formed that communicates with the oxygen-containing gas supply passage 36a and the oxygen-containing gas discharge passage 36b. The first oxygen-containing gas flow field 48 includes a plurality of flow grooves that extend in the direction indicated by the arrow C. On another surface 22b of the first separator 22, a coolant flow field 50 is formed that extends in the direction indicated by the arrow B, and communicates with the coolant supply passages 40a and the coolant discharge passages 40b.

On one surface 26a of the second separator 26 confronting the first membrane electrode assembly 24a, a first fuel gas flow field 52 is formed that communicates with the fuel gas supply passage 38a and the fuel gas discharge passage 38b. The first fuel gas flow field 52 includes a plurality of flow grooves that extend in the direction indicated by the arrow C.

On another surface 26b of the second separator 26 confronting the second membrane electrode assembly 24b, a second oxygen-containing gas flow field 54 is formed that communicates with the oxygen-containing gas supply passage 36a and the oxygen-containing gas discharge passage 36b, and extends in the direction indicated by the arrow C.

On one surface 28a of the third separator 28 confronting the second membrane electrode assembly 24b, a second fuel gas flow field 56 is formed that communicates with the fuel gas supply passage 38*a* and the fuel gas discharge passage 38*b*, and extends in the direction indicated by the arrow C. On another surface 28*b* of the third separator 28, a coolant flow field 50 is formed that communicates with the coolant supply passages 40*a* and the coolant discharge passages 40*b*.

In a central portion on one long side of the second separator 26, a voltage detecting terminal 58*a* is provided, which is positioned between the pair of coolant discharge passages 40*b* and projects outwardly. The voltage detecting terminal 58*a* is formed integrally to project from an outer peripheral portion on the long side of the thin metal plate 30 of the second separator 26. A terminal seal 32*a* is formed therearound inwardly from a leading edge of the voltage detecting terminal 58*a*. The terminal seal 32*a* is formed integrally with the seal member 32.

The third separator 28, similar to the second separator 26, is provided with a voltage detecting terminal 58*b*, which is positioned between the pair of coolant discharge passages 40*b* and side by side with the voltage detecting terminal 58*a* and projects outwardly. The voltage detecting terminal 58*b* is formed integrally to project from an outer peripheral portion on the long side of the thin metal plate 30 of the third separator 28. A terminal seal 32*a* is formed therearound inwardly from a leading edge of the voltage detecting terminal 58*b*. The terminal seal 32*a* is formed integrally with the seal member 32.

Figure 4:
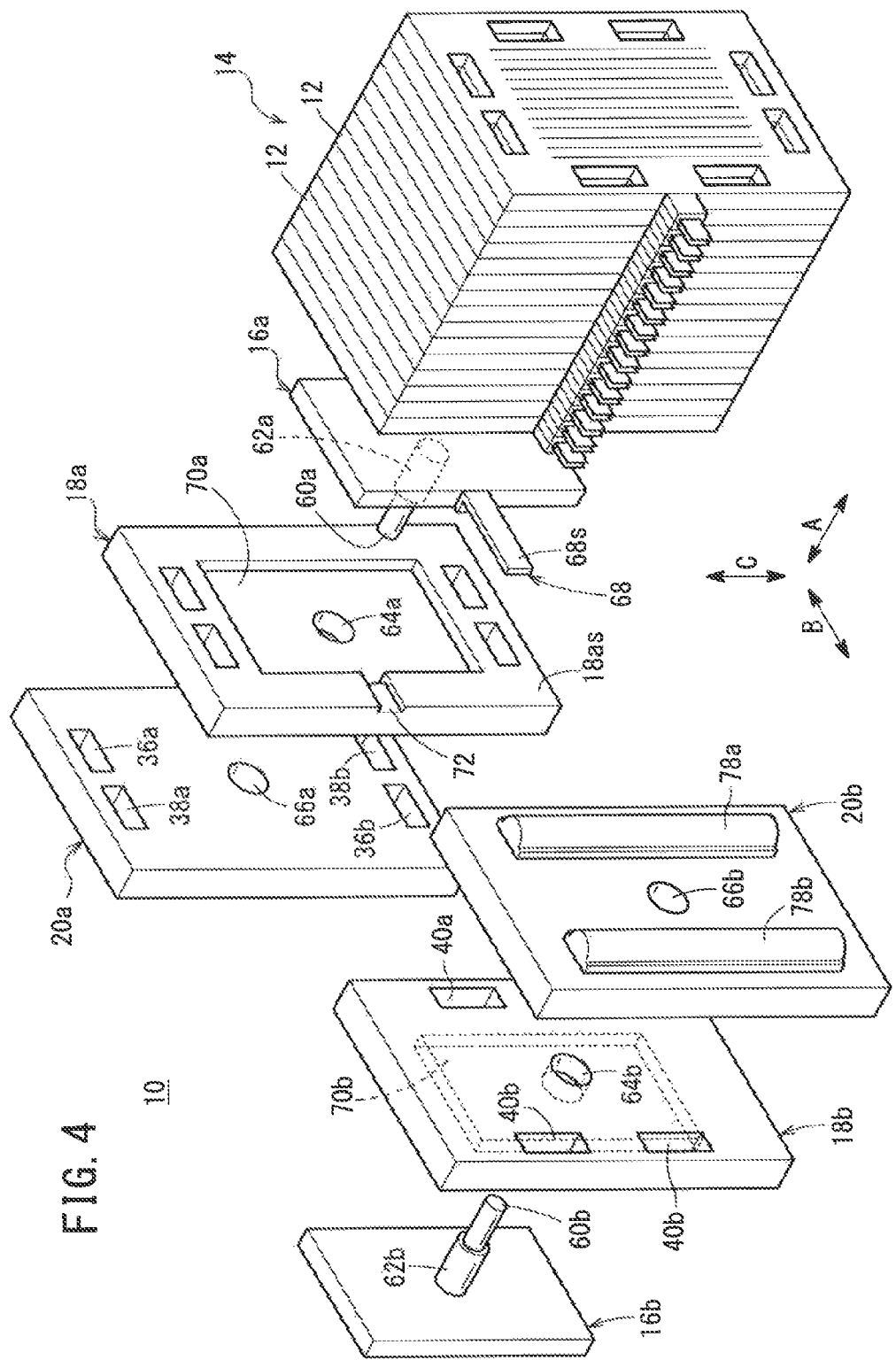
FIG. 4 is an exploded perspective view showing main components of the fuel cell stack.

As shown in FIGS. 1 and 4, terminals 60*a*, 60*b*, which extend outwardly in the stacking direction, are disposed substantially in the centers of the terminal plates 16*a*, 16*b*. The terminals 60*a*, 60*b* form power collecting terminals, through which the electrical power generated by the plural stacked power generation units 12 is taken out to the exterior, from the terminal plates 16*a*, 16*b* that are disposed on both ends of the fuel cell stack 10. The terminals 60*a*, 60*b* may also be constructed as projecting portions that project laterally in planar directions of the terminal plates 16*a*, 16*b*.

The terminal 60*a* is inserted through an insulating sleeve 62*a*, and penetrates through a hole 64*a* of the insulating plate 18*a* and a hole 66*a* of the end plate 20*a*, projecting outwardly from the end plate 20*a*. The terminal 60*b* is inserted through an insulating sleeve 62*b*, and penetrates through a hole 64*b* of the insulating plate 18*b* and a hole 66*b* of the end plate 20*b*, projecting outwardly from the end plate 20*b*.

As shown in FIGS. 2 and 4, among the terminal plates 16*a*, 16*b*, a voltage detecting terminal 68 is disposed only on the terminal plate 16*a* that abuts against the first separator 22. The material of the voltage detecting terminal 68 may be aluminum, copper, or stainless steel, and a surface thereof may be subjected to a gold or tin plating treatment or the like. The voltage detecting terminal 68, for example, is formed by bending a thin plate-shaped conductive metal plate in a substantially L-shape, and is joined to a side portion of the terminal plate 16*a* by welding, brazing or the like. The joining thereof may be performed by crimping. The voltage detecting terminal 68 is disposed at a position where the voltage detecting terminals 58*a*, 58*b* overlap in the stacking direction. The voltage detecting terminal 68 may also be formed integrally with the terminal plate 16*a*.

The insulating plate 18*a* is provided with a rectangular recess 70*a* in a center portion thereof, and the terminal plate 16*a* is accommodated in the recess 70*a*. In the insulating plate 18*a*, a cutout portion 72 is formed, one end thereof communicating with the recess 70*a*, and the voltage detecting terminal 68 is arranged in the cutout portion 72. As shown in FIGS. 2 and 4, a surface 68*s* of the voltage detecting terminal 68 and a surface 18*as* of the insulating plate 18*a* have the same height without any difference in level therebetween. Similarly, the insulating plate 18*b* is provided with a rectangular recess 70*b* in a center portion thereof, and the terminal plate 16*b* is accommodated in the recess 70*b*.

The oxygen-containing gas supply passage 36*a*, the oxygen-containing gas discharge passage 36*b*, the fuel gas supply passage 38*a*, and the fuel gas discharge passage 38*b* are formed in the insulating plate 18*a* and the end plate 20*a*. The coolant supply passages 40*a* and the coolant discharge passages 40*b* are formed in the insulating plate 18*b* and the end plate 20*b*. Alternatively, a plurality of communication passages can be provided in a suitable fashion on the end plate 20*a* or on the end plate 20*b*.

As shown in FIG. 1, an oxygen-containing gas inlet manifold 74*a* that communicates with the oxygen-containing gas supply passage 36*a*, and a fuel gas inlet manifold 76*a* that communicates with the fuel gas supply passage 38*a* are provided on both edge portions on an upper side of the end plate 20*a*. An oxygen-containing gas outlet manifold 74*b* that communicates with the oxygen-containing gas discharge passage 36*b*, and a fuel gas outlet manifold 76*b* that communicates with the fuel gas discharge passage 38*b* are provided on both edge portions on a lower side of the end plate 20*a*.

Although not illustrated, a fuel gas supply device and an oxygen-containing gas supply device are joined to the side of the end plate 20*a*. By placing the fuel gas outlet manifold 76*b* in communication with the fuel gas inlet manifold 76*a* through a non-illustrated return flow passage, a structure is provided by which the fuel gas can be recirculated and reused. Further, by such a structure, unnecessary or wasteful disposal of the fuel gas, i.e., hydrogen, can be prevented.

As shown in FIG. 4, a coolant inlet manifold 78*a* that communicates with the coolant supply passages 40*a*, and a coolant outlet manifold 78*b* that communicates with the coolant discharge passages 40*b* are provided on both left and right edge portions of the end plate 20*b*.

Figure 5:
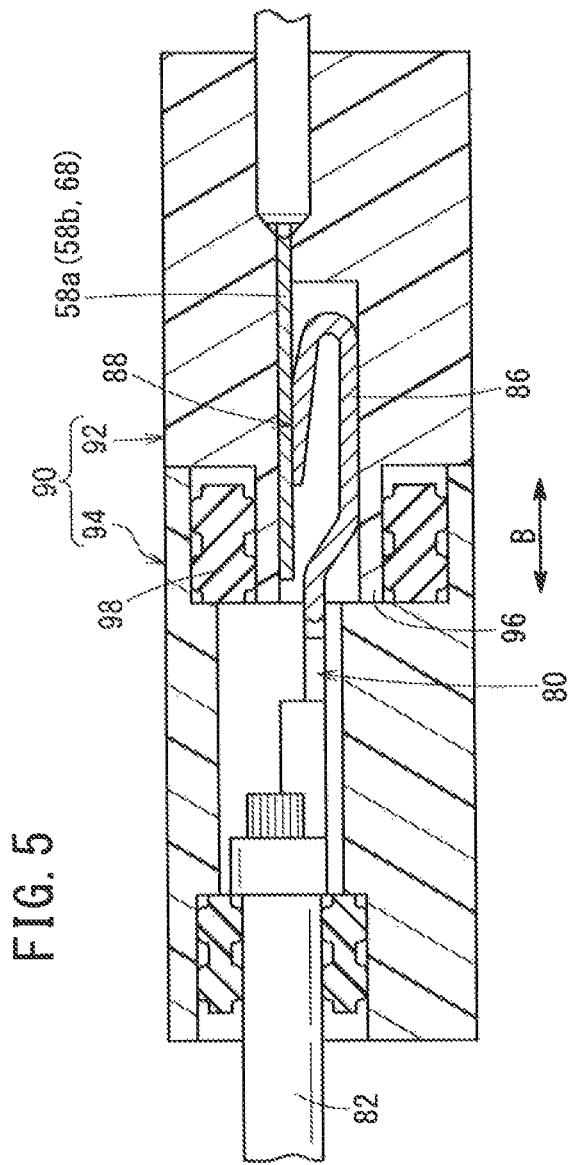
FIG. 5 is an explanatory drawing of a voltage detecting terminal and a connector of the fuel cell stack.

As shown in FIG. 5, a connector 80 is connected to the voltage detecting terminals 58*a*, 58*b*, and 68. The connector 80 is connected to a voltage measuring device (ECU) 84 through a cable 82 (see FIG. 1).

As shown in FIG. 5, the connector 80 includes a U-shaped connection terminal 86 that is connected to the voltage detecting terminals 58*a*, 58*b*, and 68. A resin casing member 90 is disposed to cover a connection location 88 between the connection terminal 86 and the voltage detecting terminals 58*a*, 58*b*, and 68. The casing member 90 comprises a first member 92 in which the voltage detecting terminals 58*a*, 58*b*, and 68 are retained, and a second member 94 in which the connector 80 is retained. An annular seal 98 is mounted externally over an outer circumferential portion of a tubular member 96 provided on the casing member 90.

Operations of the fuel cell stack 10 will be described below.

First, as shown in FIG. 1, with the fuel cell stack 10, an oxygen-containing gas or the like is supplied to the oxygen-containing gas inlet manifold 74*a* in the end plate 20*a*. On the other hand, a fuel gas such as a hydrogen-containing gas or the like is supplied to the fuel gas inlet manifold 76*a*. Further, a coolant such as pure water, ethylene glycol, or the like is supplied to the coolant inlet manifold 78*a* in the end plate 20*b*.

As shown in FIG. 3, in each of the power generation units 12, the oxygen-containing gas is introduced to the first oxygen-containing gas flow field 48 of the first separator 22 and the second oxygen-containing gas flow field 54 of the second separator 26 from the oxygen-containing gas supply passage 36a. Therefore, the oxygen-containing gas flows in a vertical downward direction along each of the cathodes 44 of the first and second membrane electrode assemblies 24a, 24b.

On the other hand, in each of the power generation units 12, the fuel gas is introduced to the first fuel gas flow field 52 of the second separator 26 and the second fuel gas flow field 56 of the third separator 28 from the fuel gas supply passage 38a. Accordingly, the fuel gas flows in a vertical downward direction along each of the anodes 46 of the first and second membrane electrode assemblies 24a, 24b.

In the foregoing manner, in the first and second membrane electrode assemblies 24a, 24b, the oxygen-containing gas supplied to each of the cathodes 44, and the fuel gas supplied to each of the anodes 46 are consumed in electrochemical reactions at the electrode catalyst layers of the cathodes 44 and the anodes 46, thereby generating electricity.

Then, the oxygen-containing gas, which is supplied to and consumed at the cathodes 44, is discharged to the oxygen-containing gas outlet manifold 74b from the oxygen-containing gas discharge passage 36b (see FIG. 1). Similarly, the fuel gas, which is supplied to and consumed at the anodes 46, is discharged to the fuel gas outlet manifold 76b from the fuel gas discharge passage 38b (see FIG. 1).

Further, as shown in FIG. 3, the coolant is introduced to the coolant flow fields 50 formed between the power generation units 12. The coolant flows in the direction of the arrow B (a horizontal direction, as shown in FIG. 3), and cools the second membrane electrode assembly 24b of one of the power generation units 12, and the first membrane electrode assembly 24a of another of the power generation units 12. The coolant is discharged into the coolant outlet manifold 78b from the coolant discharge passages 40b.

In this case, the voltage detecting terminals 58a, 58b are disposed on the second separator 26 and the third separator 28 of the power generation unit 12, whereas a voltage detecting terminal is not disposed on the first separator 22. Therefore, as shown in FIG. 2, at one end in the stacking direction of the stacked body 14, the first separator 22 contacts the terminal plate 16a, and the cell voltage of the first membrane electrode assembly 24a cannot be measured.

Thus, according to the first embodiment, among the terminal plates 16a, 16b, the voltage detecting terminal 68 is disposed only on the terminal plate 16a that is in contact with the first separator 22. Accordingly, the cell voltage at the end in the stacking direction can be measured through the voltage detecting terminal 68 of the terminal plate 16a, and there is no need to provide a dedicated dummy separator or the like. Consequently, there is no increase in the number of parts, and with a simple and compact structure, the cell voltage can be measured suitably.

Figure 6:
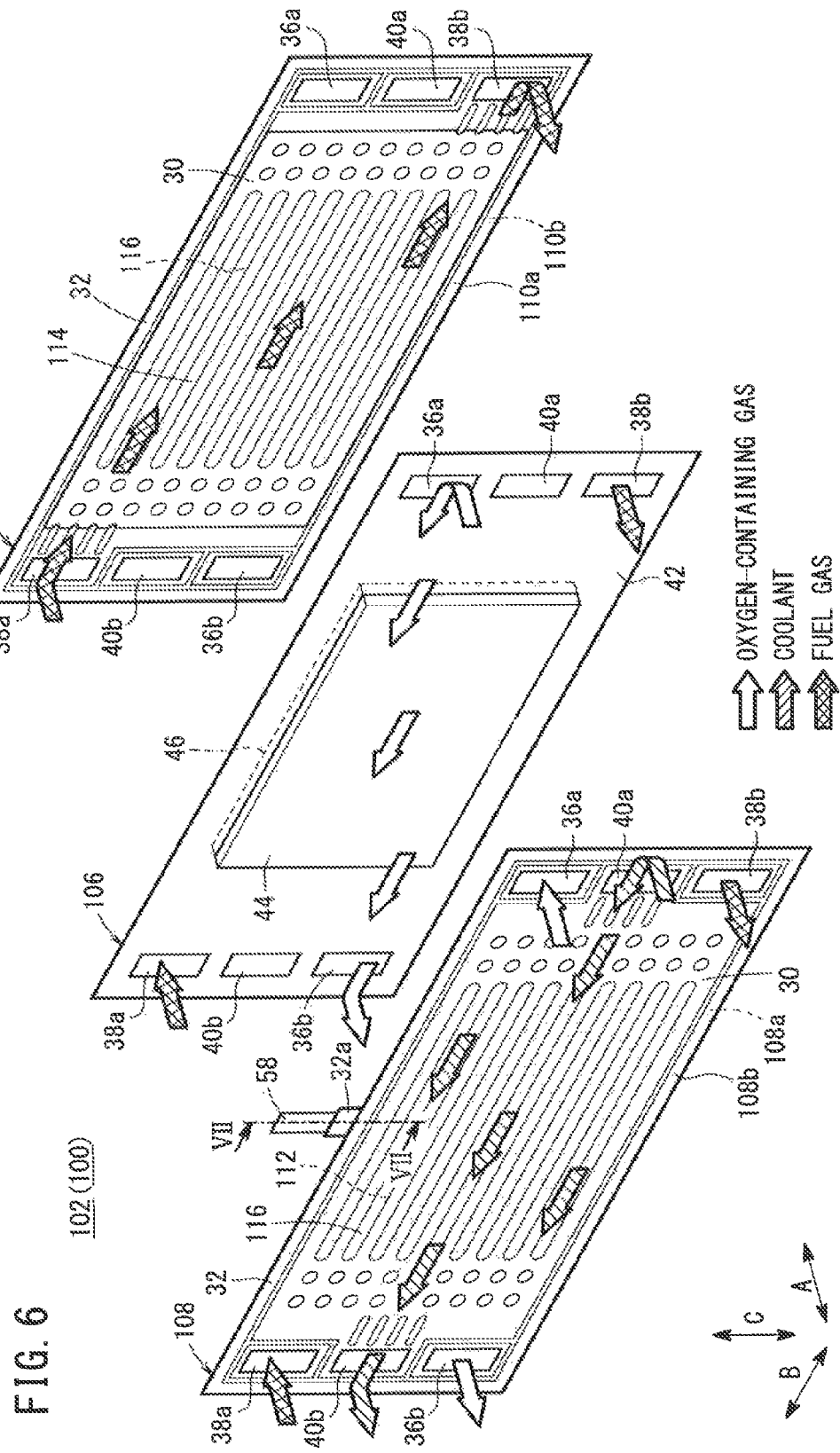
FIG. 6 is an exploded perspective view showing main components of a fuel cell stack according to a second embodiment of the present invention.
Figure 7:
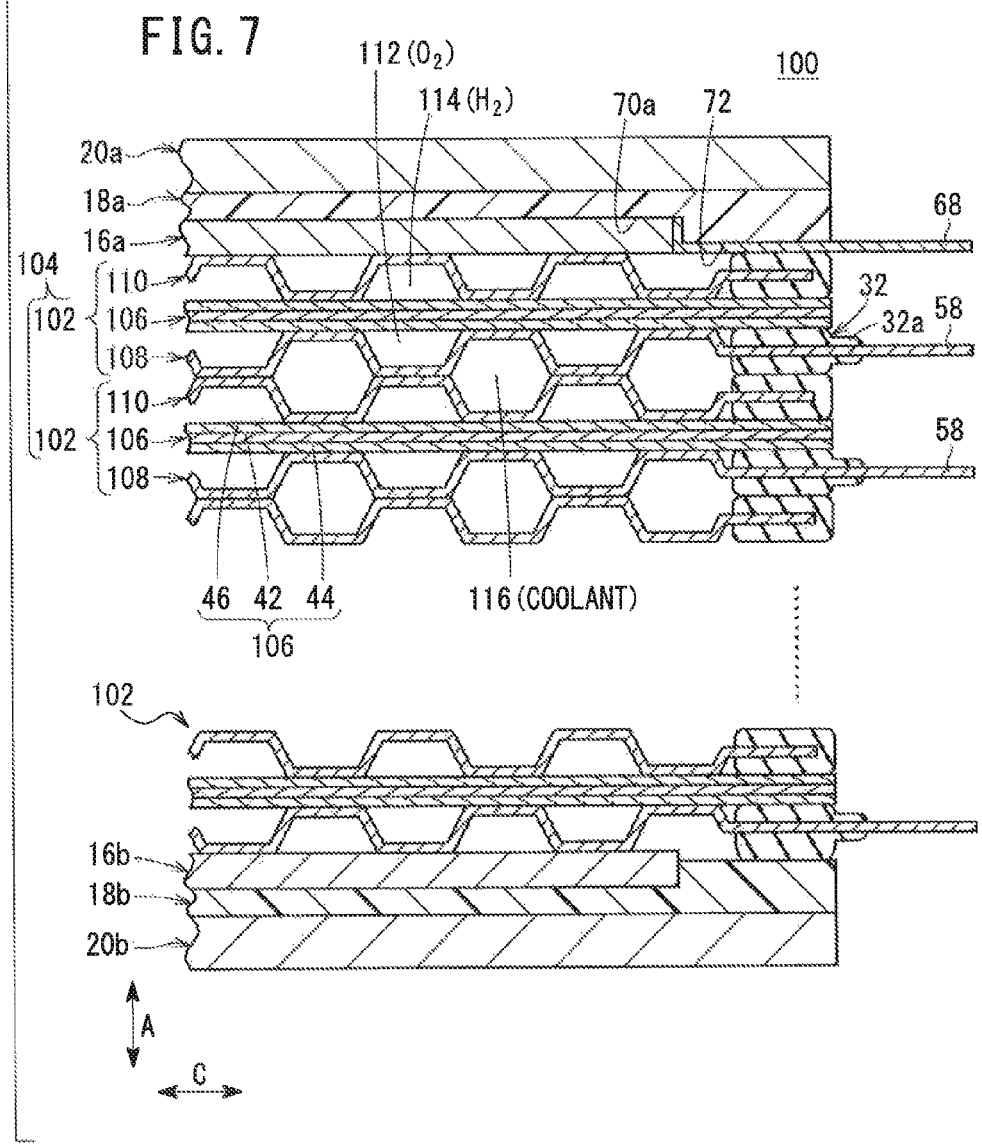
FIG. 7 is a cross sectional view of the fuel cell stack, taken along line VII-VII in FIG. 6.

As shown in FIGS. 6 and 7, a fuel cell stack 100 according to a second embodiment of the present invention comprises a stacked body 104 in which a plurality of power generation units (power generation cells) 102 are stacked in the direction of the arrow A. On both ends in the stacking direction of the stacked body 104, terminal plates 16a, 16b, insulating plates 18a, 18b, and end plates 20a, 20b are arranged outwardly in the stacking direction. Other constituent elements that are identical to those of the fuel cell stack 10 according to the first embodiment are labeled with the same reference numerals, and detailed description thereof is omitted.

The power generation unit 102 includes a membrane electrode assembly 106, and a first separator 108 and a second separator 110 sandwiching the membrane electrode assembly 106.

The first separator 108 and the second separator 110 are constituted by separators such as steel plates, stainless steel plates, aluminum plates, plated steel sheets, or metal plates having anti-corrosive surfaces formed thereon by a surface treatment. Seal members 32 are formed integrally around the outer circumference of the thin metal plates 30 that are provided respectively on the first separator 108 and the second separator 110. For the first separator 108 and the second separator 110, instead of metal separators, for example, carbon separators may be used.

At one end in the direction of the arrow B of the power generation unit 102, an oxygen-containing gas supply passage 36a, a coolant supply passage 40a, and a fuel gas discharge passage 38b are provided, which extend through the power generation unit 102 in the stacking direction indicated by the arrow A. At another end in the direction of the arrow B of the power generation unit 102, a fuel gas supply passage 38a, a coolant discharge passage 40b, and an oxygen-containing gas discharge passage 36b are provided, which extend through the power generation unit 102 in the direction of the arrow A.

The second separator 110 has a fuel gas flow field 114, which extends in the direction of the arrow B, for example, on a surface 110a thereof facing the membrane electrode assembly 106. The fuel gas flow field 114 communicates with the fuel gas supply passage 38a and the fuel gas discharge passage 38b.

The first separator 108 has an oxygen-containing gas flow field 112, which extends in the direction of the arrow B, for example, on a surface 108a thereof facing the membrane electrode assembly 106. The oxygen-containing gas flow field 112 communicates with the oxygen-containing gas supply passage 36a and the oxygen-containing gas discharge passage 36b. A coolant flow field 116, which communicates with the coolant supply passage 40a and the coolant discharge passage 40b, is formed between a surface 108b of the first separator 108 and a surface 110b of the adjacent second separator 110.

In a central portion on one long side of the first separator 108, an outwardly projecting voltage detecting terminal 58 is provided. The voltage detecting terminal 58 is formed integrally to project from an outer peripheral portion on the long side of the thin metal plate 30 of the first separator 108. A terminal seal 32a is formed therearound inwardly from a leading edge of the voltage detecting terminal 58.

As shown in FIG. 7, among the terminal plates 16a, 16b, a voltage detecting terminal 68 is disposed only on the terminal plate 16a. The second separator 110 directly contacts the terminal plate 16a, and a voltage detecting terminal is not disposed on the second separator 110.

With the second embodiment, the voltage detecting terminal 58 is disposed on the first separator 108 of the power generation unit 102, whereas a voltage detecting terminal is not disposed on the second separator 110. Therefore, at one end in the stacking direction of the stacked body 104, the second separator 110 contacts the terminal plate 16a, and the cell voltage cannot be measured.

Thus, among the terminal plates 16a, 16b, the voltage detecting terminal 68 is disposed only on the terminal plate 16a that abuts against the second separator 110. Accordingly, the cell voltage at the end in the stacking direction can be measured through the voltage detecting terminal 68 of the terminal plate 16a, and there is no need to provide a dedicated dummy separator or the like. Consequently, the same effects and advantages as those of the first embodiment can be obtained, in that there is no increase in the number of parts, and with a simple and compact structure, the cell voltage can be measured suitably.

Figure 8:
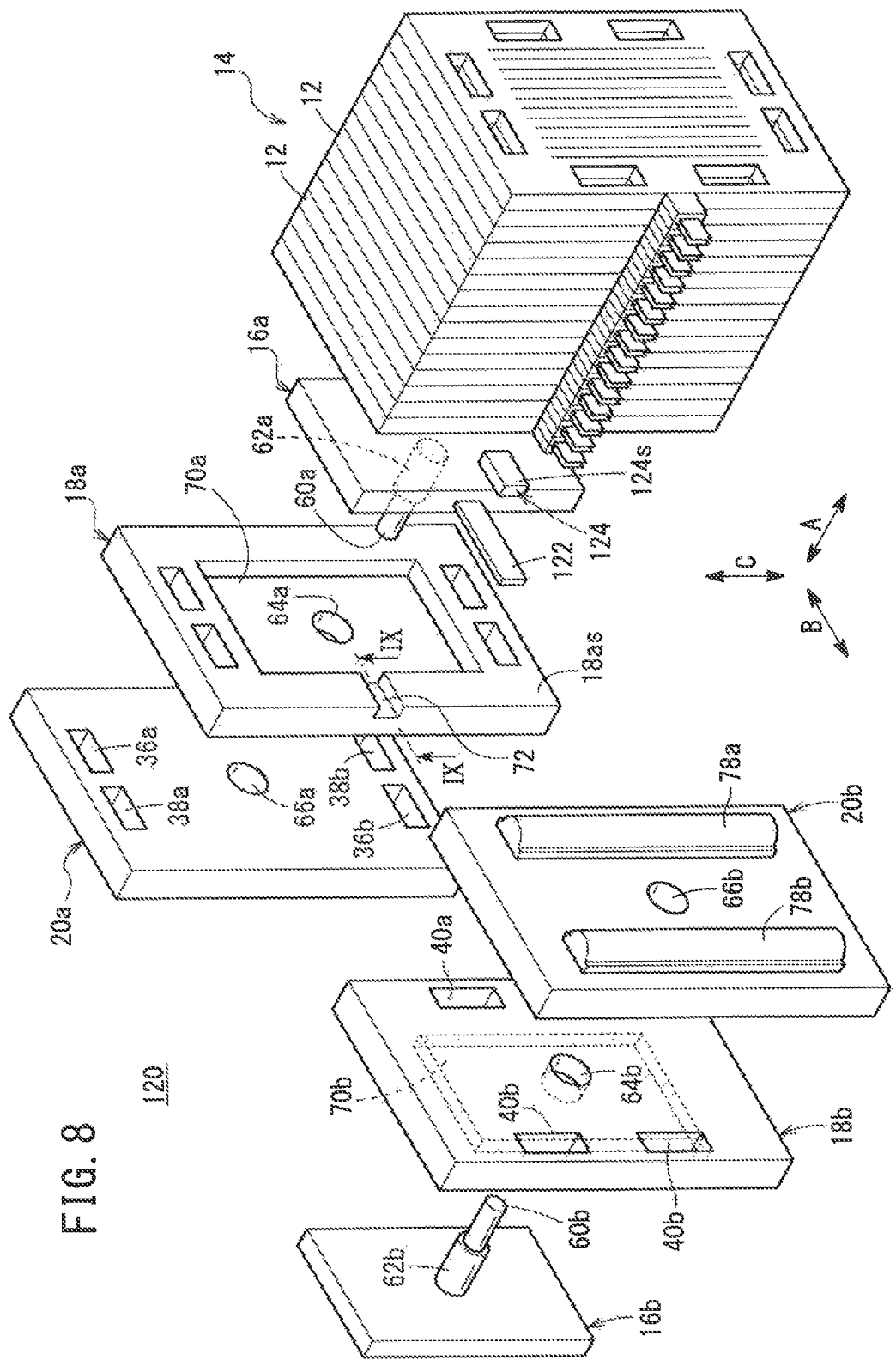
FIG. 8 is an exploded perspective view showing main components of a fuel cell stack according to a third embodiment of the present invention.

As shown in FIG. 8, with a fuel cell stack 120 according to a third embodiment of the present invention, on both ends in the stacking direction of the stacked body 14 (or the stacked body 104), terminal plates 16a, 16b, insulating plates 18a, 18b, and end plates 20a, 20b are arranged outwardly in the stacking direction. Other constituent elements that are identical to those of the fuel cell stack 10 according to the first embodiment are labeled with the same reference numerals, and detailed description thereof is omitted.

Figure 9:
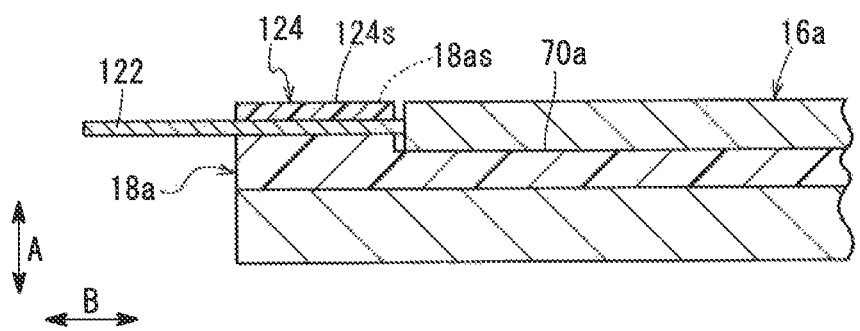
FIG. 9 is a cross sectional view taken along line IX-IX of FIG. 8, showing a terminal plate and an insulating plate of the fuel cell stack.

On a side portion of the terminal plate 16a, a voltage detecting terminal 122 is provided either integrally or separably therewith. The voltage detecting terminal 122 is arranged in a cutout portion 72 of the insulating plate 18a. In the cutout portion 72, a cover member 124 is mounted in covering relation to the voltage detecting terminal 122 (see FIGS. 8 and 9). A surface 124s of the cover member 124 and the surface 18 as of the insulating plate 18a have the same height without any difference in level therebetween.

Figure 10:
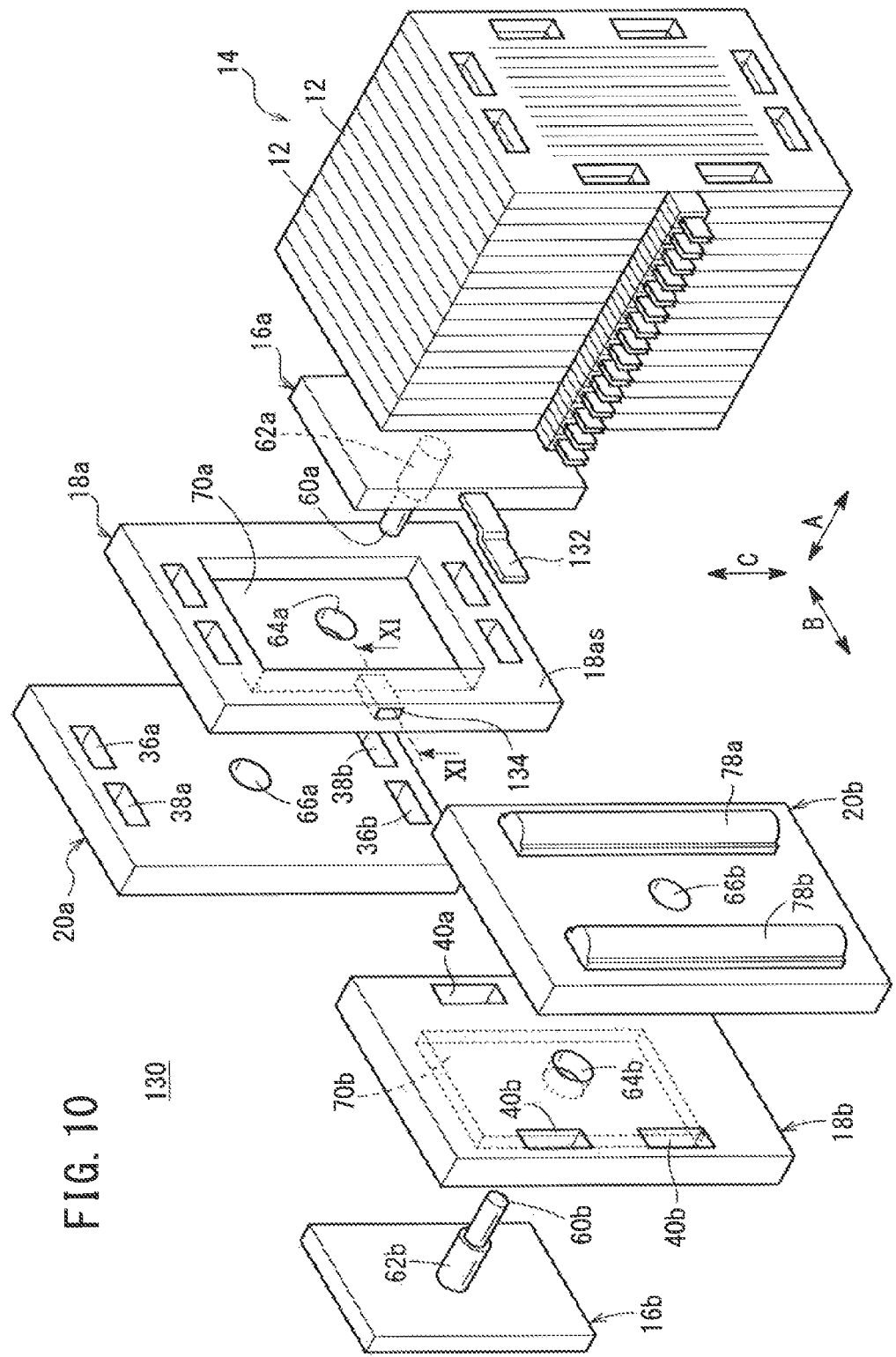
FIG. 10 is an exploded perspective view showing main components of a fuel cell stack according to a fourth embodiment of the present invention.

As shown in FIG. 10, with a fuel cell stack 130 according to a fourth embodiment of the present invention, on both ends in the stacking direction of the stacked body 14 (or the stacked body 104), terminal plates 16a, 16b, insulating plates 18a, 18b, and end plates 20a, 20b are arranged outwardly in the stacking direction. Other constituent elements that are identical to those of the fuel cell stack 10 according to the first embodiment are labeled with the same reference numerals, and detailed description thereof is omitted.

On a side portion of the terminal plate 16a, a voltage detecting terminal 132 is provided either integrally or separably therewith. The voltage detecting terminal 132 is formed by bending a thin plate-shaped conductive metal plate in a doglegged shape. A rectangular opening 134 is formed on a side portion of the insulating plate 18a.

Figure 11:
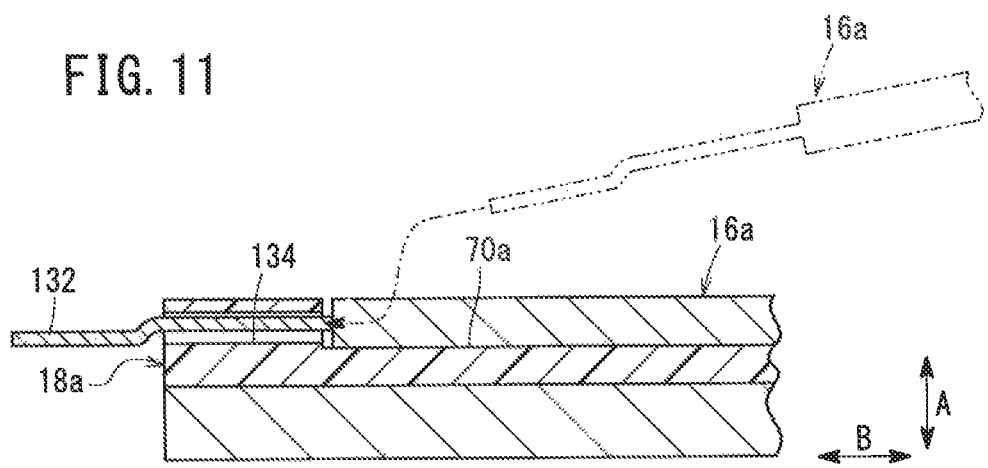
FIG. 11 is a cross sectional view taken along line XI-XI of FIG. 10, showing a terminal plate and an insulating plate of the fuel cell stack.

As shown in FIG. 11, the voltage detecting terminal 132 of the terminal plate 16a is inserted into the opening 134 in an inclined posture from the side of the recess 70a (refer to the two-dot dashed line in FIG. 11), and thereafter, the terminal plate 16a is changed into a horizontal posture and placed in the recess 70a. The voltage detecting terminal 132 is inserted into the opening 134 such that the distal end thereof projects outwardly from the opening 134.

As shown in FIG. 12, a fuel cell stack 140 according to a fifth embodiment of the present invention is constructed in substantially the same manner as the fuel cell stack 10 according to the first embodiment of the present invention.

Other constituent elements that are identical to those of the fuel cell stack 10 according to the first embodiment are labeled with the same reference numerals, and detailed description thereof is omitted. Further, the fuel cell stack 140 according to the fifth embodiment may be constructed in the same manner as the fuel cell stack 100 according to the second embodiment. The same applies to the six through ninth embodiments, to be discussed below.

With the fuel cell stack 140, the voltage detecting terminal 142 is provided either integrally or separably only on the terminal plate 16a. The voltage detecting terminal 142, for example, is constituted in the shape of a flat plate from a thin plate-shaped conductive metal plate.

In the terminal plate 16a, a recess 144 is formed therein on the side of the recess 70a of the insulating plate 18a, and a rectangular opening 146, which communicates with the recess 144 and opens to the outside, is formed in the insulating plate 18a. The voltage detecting terminal 142 is inserted into the opening 146 and the recess 144, and is joined onto the flat surface of the terminal plate 16a by welding, brazing, or the like.

As shown in FIG. 13, with a fuel cell stack 150 according to a sixth embodiment of the present invention, the voltage detecting terminal 152 is provided either integrally or separably only on the terminal plate 16a. The voltage detecting terminal 152, for example, is constituted in the shape of a flat plate from a thin plate-shaped conductive metal plate.

In the insulating plate 18a, a recess 154 is formed therein that communicates with the recess 70a, and a rectangular opening 156, which communicates with the recess 154 and opens to the outside, also is formed in the insulating plate 18a. The voltage detecting terminal 152 is inserted into the opening 156 and the recess 154, and is joined onto the flat surface of the terminal plate 16a by welding, brazing or the like.

As shown in FIG. 14, with a fuel cell stack 160 according to a seventh embodiment of the present invention, the voltage detecting terminal 162 is provided either integrally or separably only on the terminal plate 16a. The voltage detecting terminal 162, for example, is constituted in the shape of a flat plate from a thin plate-shaped conductive metal plate.

In the terminal plate 16a, a recess 164 that is continuous with the cutout portion 72 of the insulating plate 18a is formed in a surface thereof on the side of the first separator 22. The voltage detecting terminal 162 is arranged in the cutout portion 72 and the recess 164, and is joined onto the flat surface of the terminal plate 16a by welding, brazing, or the like.

As shown in FIG. 15, with a fuel cell stack 170 according to an eighth embodiment of the present invention, the voltage detecting terminal 172 is provided either integrally or separably only on the terminal plate 16a. The voltage detecting terminal 172, for example, is constituted in the shape of a flat plate from a thin plate-shaped conductive metal plate.

On the first separator 22 that abuts against the terminal plate 16a, a recess 174a is formed on a projecting portion 174 thereof that projects toward the terminal plate 16a. The voltage detecting terminal 172 is arranged in the recess 174a of the first separator 22, and is joined onto the flat surface of the terminal plate 16a by welding, brazing, or the like.

As shown in FIG. 16, with a fuel cell stack 180 according to a ninth embodiment of the present invention, the voltage detecting terminal 182 is provided either integrally or separably only on the terminal plate 16a. The voltage detecting terminal 182 is constituted in the shape of a flat plate from a thin plate-shaped conductive metal plate, and seal members 184 are disposed on opposite surfaces thereof, which are sandwiched between the insulating plate 18a and the first separator 22.

In the terminal plate 16a, a recess 186 is formed in a surface thereof on the side of the first separator 22. The voltage detecting terminal 182 is arranged in the recess 186, and is joined onto the flat surface of the terminal plate 16a by welding, brazing, or the like.

With the fifth through ninth embodiments, the same effects and advantages as those of the above-described first embodiment are obtained.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell stack comprising:
a stacked body formed by stacking, in a stacking direction,
a plurality of power generation cells for generating electrical energy, each of the power generation cells being formed by stacking an electrolyte electrode assembly and separators, the electrolyte electrode assembly including an electrolyte and a pair of electrodes provided respectively on both sides of the electrolyte;
terminal plates arranged on both ends in the stacking direction of the stacked body; and
end plates, each of which is stacked outwardly in the stacking direction of a corresponding one of the terminal plates with an insulating plate interposed there between,
wherein the power generation cell includes a voltage detecting terminal on at least one of the separators, and another voltage detecting terminal is provided integrally on only one of the terminal plates and
wherein the other voltage detecting terminal is a member separate from the one terminal plate, directly abutting against the outer end of the one terminal plate.

2. The fuel cell stack according to claim 1, wherein: in each of the power generation cells, a first separator, a first electrolyte electrode assembly, a second separator, a second electrolyte electrode assembly, and a third separator are stacked, and in the power generation cell arranged on one end in the stacking direction of the stacked body, the first separator contacts the one of the terminal plates; and the voltage detecting terminals are provided only on the second separator and the third separator.

3. The fuel cell stack according to claim 1, wherein one of the insulating plates, which is stacked on the one of the terminal plates, is formed with a recess in which one of the terminal plates is accommodated, and a cutout portion in which the other voltage detecting terminal is arranged.

4. The fuel cell stack according to claim 1, wherein: in each of the power generation cells, a first separator, an electrolyte electrode assembly, and a second separator are stacked, and in the power generation cell arranged on one end in the stacking direction of the stacked body, the second separator contacts the one of the terminal plates; and the voltage detecting terminal is provided only on the first separator.

5. A fuel cell stack comprising:
a stacked body formed by stacking, in a stacking direction,
a plurality of power generation cells for generating electrical energy, each of the power generation cells being formed by stacking an electrolyte electrode assembly and separators, the electrolyte electrode assembly including an electrolyte and a pair of electrodes provided respectively on both sides of the electrolyte;
terminal plates arranged on both ends in the stacking direction of the stacked body; and
end plates, each of which is stacked outwardly in the stacking direction of a corresponding one of the terminal plates with an insulating plate interposed there between,
wherein the power generation cell includes a voltage detecting terminal on at least one of the separators, and
another voltage detecting terminal is provided integrally on only one of the terminal plates, and
wherein one of the insulating plates, which is stacked on the one of the terminal plates, is formed with a recess in which the one of the terminal plates is accommodated, and a cutout portion in which the other voltage detecting terminal is arranged.

* * * * *